(12) United States Patent
Wei

(10) Patent No.: US 10,795,110 B2
(45) Date of Patent: Oct. 6, 2020

(54) LENS MODULE

(71) Applicant: Chuandong Wei, Shenzhen (CN)

(72) Inventor: Chuandong Wei, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 15/358,481

(22) Filed: Nov. 22, 2016

(65) Prior Publication Data
US 2018/0024308 A1 Jan. 25, 2018

(30) Foreign Application Priority Data

Jul. 20, 2016 (CN) .................... 2016 2 0762204 U
Sep. 15, 2016 (JP) ................................ 2016-180559

(51) Int. Cl.
G02B 7/02 (2006.01)
G02B 13/00 (2006.01)

(52) U.S. Cl.
CPC ............. *G02B 7/021* (2013.01); *G02B 7/025* (2013.01); *G02B 13/004* (2013.01)

(58) Field of Classification Search
CPC ........ G02B 7/021; G02B 7/022; G02B 7/025; G02B 13/001
USPC ......................................................... 359/819
See application file for complete search history.

(56) References Cited

U.S. PATENT DOCUMENTS

| 2004/0042092 A1* | 3/2004 | Nomura ................. G02B 7/022 359/819 |
| 2009/0079863 A1* | 3/2009 | Aoki .................... G02B 13/001 348/374 |
| 2011/0063739 A1* | 3/2011 | Hirata ................... G02B 7/021 359/819 |

* cited by examiner

Primary Examiner — Kristina M Deherrera
(74) Attorney, Agent, or Firm — IPro, PLLC; Na Xu

(57) ABSTRACT

A lens module is disclosed. The lens module includes a lens barrel having a first bonding face; a first lens; and a fixing component installed inside the lens barrel and including a second bonding face. At least one the first bonding face and the second bonding face is configured to be lumpy, and the first bonding face and the second bonding face are bonded by glue. The first bonding face, the second bonding face and the glue form a bonding structure.

7 Claims, 3 Drawing Sheets

LENS MODULE

FIELD OF THE INVENTION

The present disclosure relates to a lens module with a bonding structure.

DESCRIPTION OF RELATED ART

With progressive development of technology, electronic devices are developed constantly toward intelligent types. In addition to digital camera, portable electronic devices such as iPad, mobile phone and so on are also equipped with lens module to meet the higher requirements of people on the imaging quality of lens module, higher requirements on the reliability of the products. The reliability of the camera module to a great extent is associated with the stability of the bonding structure of the lens module.

Due to the miniaturization of camera module, the bonding structure is generally very small, the bonding area is limited and the bonding strength is very limited, prone to fall off, influencing the reliability of the product.

Therefore, it is necessary to provide an improved lens module to overcome above disadvantage.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain this disclosure, not intended to limit this disclosure.

Figure 1:
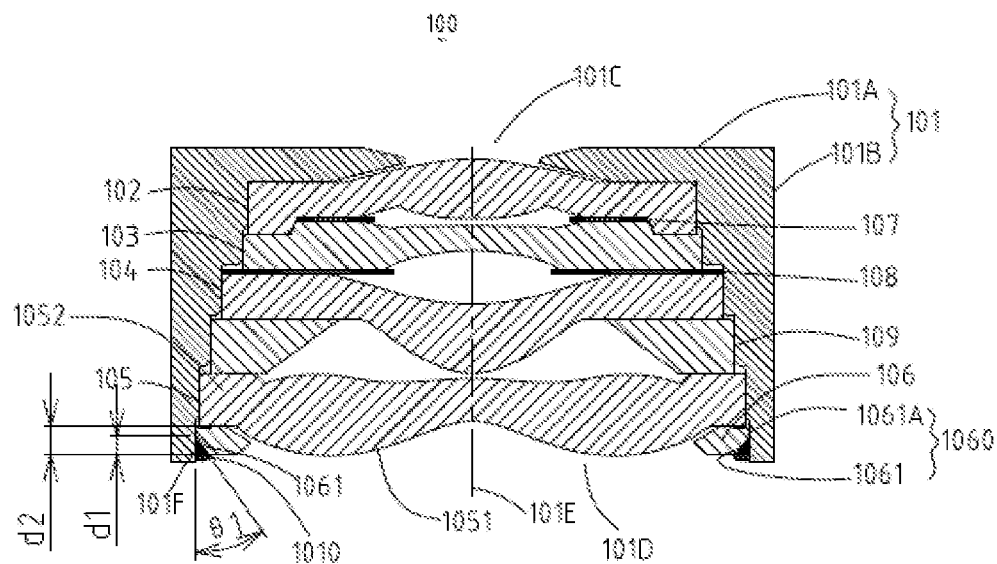
FIG. 1 is an illustration of a lens module in accordance with a first embodiment of the present disclosure.

As shown in FIG. 1, a lens module 100 includes a lens barrel 101 and a lens group accommodated in the lens barrel 101. The lens barrel 101 comprises a first barrel wall 101A with an optical aperture 101C, a second barrel wall 101B extended un-straightly from the first barrel wall 101A, and an accommodation space 101D created by the first barrel wall 101A and the second barrel wall 101B. The lens group includes a fifth lens 102, a fourth lens 103, a third lens 104 and a first lens 105 which are stacked in turn from the object side to the image side. The first lens 105, the fifth lens 102, the fourth lens 103, the third lens 104 and the first lens 105 are distributed axially along the lens barrel 101. The first lens 105 includes an optical portion 1051 and a non-optical portion 1052 surrounding the optical portion 1051. A first shade 107 is provided between the fifth lens 102 and the fourth lens 103. A second shade 108 is provided between the fourth lens 103 and the third lens 104. A shading board 109 is installed between the third lens 104 and the first lens 105. The lens module 100 also includes a ring-shaped fixing component 106 installed at the image side of the first lens 105 and fixed to the lens barrel 101 by glue 1010. The fixing component 106 abuts against the non-optical portion 1052 for fixing the first lens 105 in the lens barrel 101.

The second tunnel wall 101B of the lens barrel 101 is provided also a first bonding face 101F. In other embodiments, the first bonding face can be installed at any place on the inner wall of the first bonding structure.

An outer side surface 1060 of the fixing component 106 includes an attaching portion 1061A fitting with the lens barrel 101 and a second bonding face 1601 corresponding to the first bonding face 101F. The attaching portion 1501 is proximal to an object side of the lens module 100 compared to the second bonding face 1052. The fixing component 106 provides an optical hole 106C for exposing the optical portion 1051 of the first lens 101. The second bonding face 1061 of the fixing component 106 is fixed to the first bonding face 101F by the glue 1010, so the fixing component 106 is fixed in the lens barrel 101. The lens module 100 can be assembled stably.

In this embodiment, both the first bonding face 101F and the second bonding face 1061 are uneven, and fixed each other by the glue 1010. The first bonding face 101F, the second bonding face 1061 and the glue 1010 form a bonding structure. In other embodiments, at least one of the first bonding face and the second bonding face is uneven.

Figure 2:
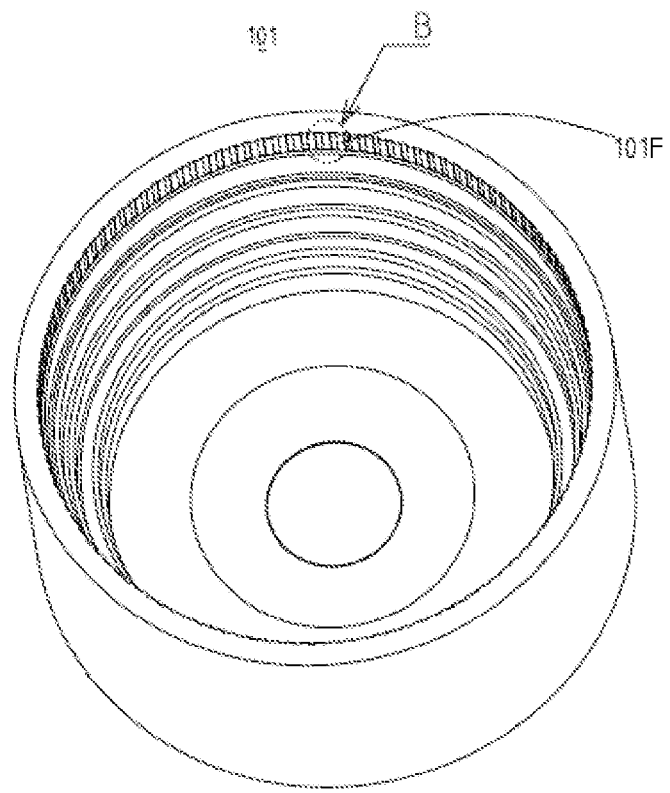
FIG. 2 is an illustration of a lens barrel of the lens module in FIG. 1.
Figure 3:
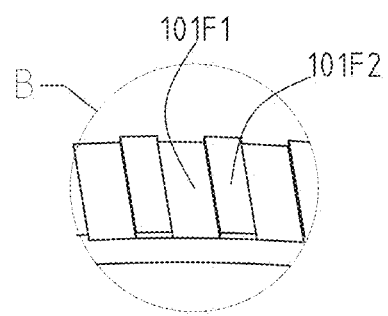
FIG. 3 is an enlarged view of Part B in FIG. 2.

As shown in FIGS. 2-3, the first bonding face 101F of the lens barrel 101 is equipped with a first groove 101F1 and a first lug 101F2 in array distribution. The surface area of the first bonding face 101F is increased and the contact area of the first bonding face with the glue 1010 is also increased accordingly. At the same time the intensity of the lens barrel 101 can be improved.

In this embodiment, the first groove 101F1 and the first lug 101F2 are rectangle. In other embodiments, they can be arc surface and other shapes.

In this embodiment, the side length of the first groove 101F1 vertical to the optical axis 101E and the side length of the first lug 101F2 vertical to the optical axis 101E are not same. In other embodiments, the side length of the first groove and the first lug vertical to the optical axis can be same.

Figure 4:
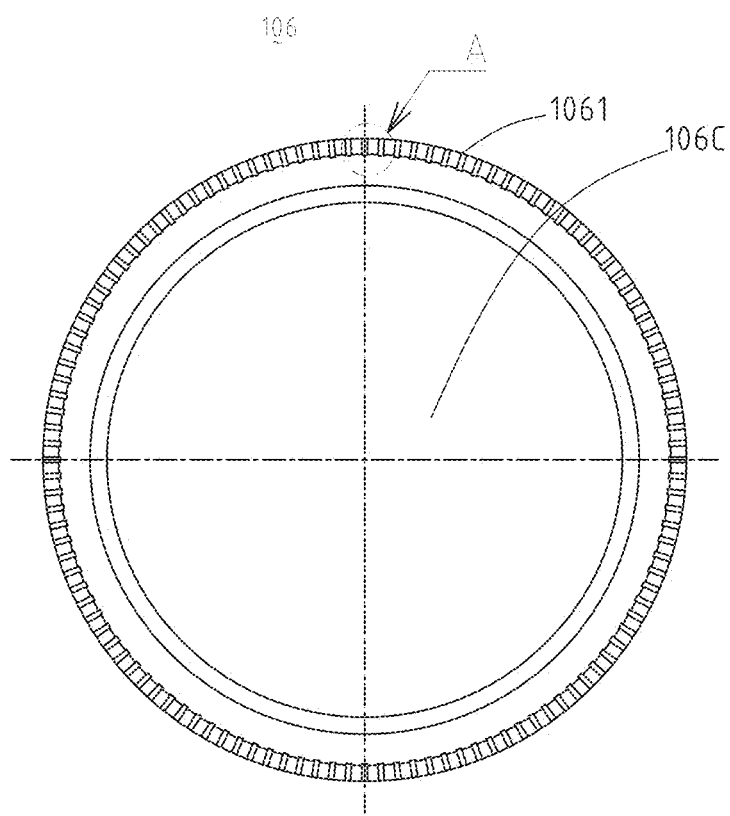
FIG. 4 is an illustration of a fixing component of the lens module.
Figure 5:
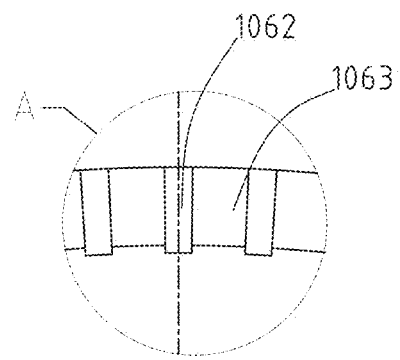
FIG. 5 is an enlarged view of Part A in FIG. 4.

As shown in FIGS. 4-5, the outer side surface of the fixing component 106 is provided with a first bevel face 1061. The second bonding face is the first bevel face 1061 of outer side of the fixing component 106. The second bonding face 1061 is equipped with a second lug 1063 and a second groove 1062 in array distribution. The surface area of the second bonding face 1061 is increased and the contact area of the second bonding face with the glue 1010 is also increased accordingly.

In this embodiment, the second groove 1062 and the second lug 1063 are rectangle. In other embodiments, they can be arc surface and other shapes.

In this embodiment, the side length of the second lug 1063 vertical to the optical axis 101E and the side length of the second groove 1062 vertical to the optical axis 101E are not same. In other embodiments, the side length of the second lug and the second groove vertical to the optical axis 101E can be same.

In this embodiment, the sum of the side length of the first lug 101F1 and the side length of the first groove 101F2 vertical to the optical axis 101E is not equal to the sum of the side length of the second lug 1063 and the second groove 1062 vertical to the optical axis 101E. In other embodiments, they can also be not equal.

As shown in FIG. 1, the angle between the first bevel face 1061 and the optical axis 101E is θ1, meeting $0°≤θ1≤80°$. The projection length of the first bevel face 1061 on the second barrel wall 101B is d1. The projection length of entire fixing component 106 on the second barrel wall 101B is d2. d1 is approximately two-thirds of d2, so that the area of the second bonding face 1061 is big enough and the strength of the fixing component 106 can be ensured.

As shown in FIG. 5, the angle between the projection of the side of the second lug 1063 not vertical to the optical axis 101E on the surface vertical to the optical axis 101E and the connecting line between the outer side endpoint of the projection and the axis is θ2, meeting $0°≤θ2≤80°$.

In this embodiment, θ2=0°.

Figure 6:
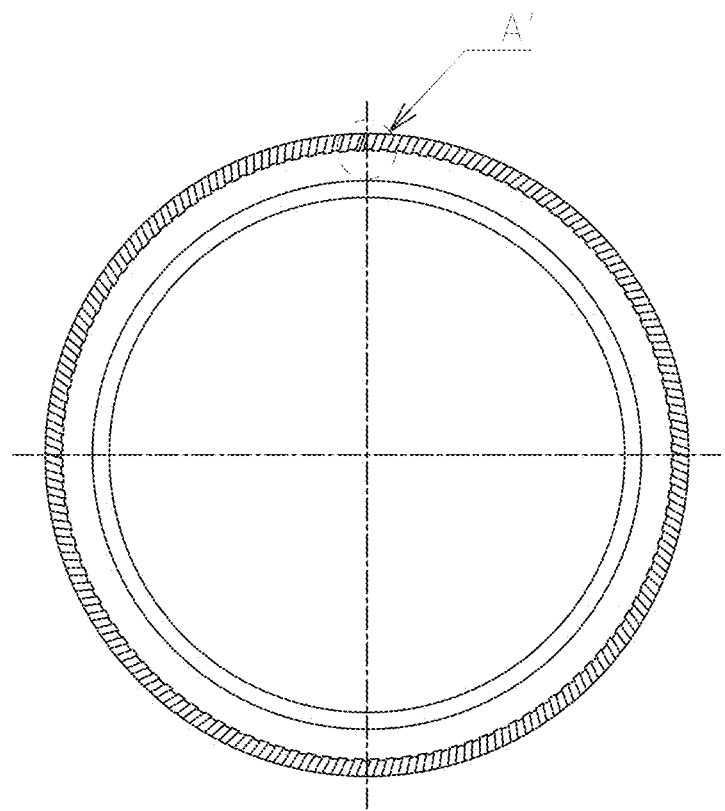
FIG. 6 is an illustration of a fixing component of a lens module in accordance with another exemplary embodiment of the present disclosure.
Figure 7:
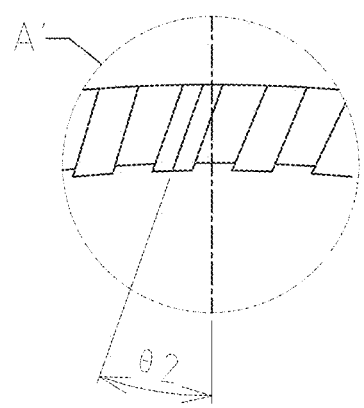
FIG. 7 is an enlarged view of Part A' in FIG. 6.

As shown in FIGS. 6-7, the present disclosure discloses the fixing component of another embodiment and θ2 meets $0°≤θ2≤80°$.

In other embodiments, the lens module can also comprise further at least a second lens located in the lens barrel. The second lens is stacked along optical axis at the object side or image side of the first lens.

In this embodiment, the lens group includes four lenses. In other embodiments, the number of lenses in the lens group can be any number bigger than or equal to 1 according to the actual need. The fixing component can also be any number bigger than or equal to 1. Other fixing component and the lens barrel can be fixed by glue through the bonding structure described above and can also be fixed through other mode.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A lens module including:
a lens barrel having a first bonding face;
a first lens including an optical portion and a non-optical portion surrounding the optical portion;
a ring-shaped fixing component installed inside the lens barrel and abutting against the non-optical portion for fixing the first lens in the lens barrel, an outer side surface of the fixing component including an attaching portion fitting with the lens barrel and a second bonding face corresponding to and spaced apart from the first bonding face, the attaching portion proximal to an object side of the lens module compared to the second bonding face, the fixing component providing an optical hole for exposing the optical portion of the first lens; wherein
both the first bonding face and the second bonding face are configured to be lumpy, and the first bonding face and the second bonding face are bonded by glue, and the first bonding face, the second bonding face and the glue form a bonding structure;
the lens barrel comprises a first barrel wall having an optical aperture and a second barrel wall extending from the first barrel wall, and the first bonding face formed on the second barrel wall,
the first bonding face including a plurality of first lugs and first grooves arranged alternately, the second bonding face including a plurality of second lugs and second grooves arranged alternately, the first grooves and the second grooves filled with the glue, and
the projection length of the second bonding face on the second barrel wall is approximately two-thirds of the projection length of the entire fixing component on the second barrel wall.

2. The lens module as described in claim 1, wherein the first lug, the first groove, the second lug, and second groove are parallelogram, the sum of the side length of the first lug perpendicular to the optical axis and the side length of the first groove perpendicular to the optical axis is equal to the sum of the side length of the second lug perpendicular to the optical axis and the side length of the second groove perpendicular to the optical axis.

3. The lens module as described in claim 2, wherein the outer side surface of the fixing component is provided with a first bevel face, the second bonding face serves as the first bevel face.

4. The lens module as described in claim 3, wherein an angle between the first bevel face and the optical axis is θ1 and meets the following condition $0°≤θ1≤80°$.

5. The lens module as described in claim 4, wherein the second lug is a parallelogram formed by a pair of sides perpendicular to the optical axis and a pair of sides not perpendicular to the optical axis, and an angle formed by the side not perpendicular to the optical axis and a line parallel to the optical axis is θ2, meeting $0°≤θ2≤80°$.

6. The lens module as described in claim 1, wherein the first grooves and the first lugs are evenly distributed on the first bonding surface in circumferential direction.

7. The lens module as described in claim 1, wherein the second grooves and the second lugs are evenly distributed on the second bonding surface in circumferential direction.

* * * * *